US008204890B1

(12) United States Patent
Gogan (10) Patent No.: US 8,204,890 B1
(45) Date of Patent: Jun. 19, 2012

(54) MEDIA CONTENT VOTING, RANKING AND PLAYING SYSTEM

(75) Inventor: Brian Gogan, Aptos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,544

(22) Filed: Sep. 26, 2011

(51) Int. Cl.
*G06F 17/30* (2006.01)
(52) U.S. Cl. ........ 707/748; 707/770; 707/783; 709/201; 709/230; 713/163
(58) Field of Classification Search .................. 707/748, 707/783, 913, 999.001, 770; 705/12, 319; 369/30.08; 709/201, 230; 713/163
See application file for complete search history.

(56) References Cited

U.S. PATENT DOCUMENTS

| | | | |
|---|---|---|---|
| 7,113,999 B2 * | 9/2006 | Pestoni et al. | 709/231 |
| 7,685,204 B2 * | 3/2010 | Rogers | 707/770 |
| 8,051,130 B2 * | 11/2011 | Logan et al. | 709/204 |
| 8,099,334 B1 * | 1/2012 | Stockwell | 705/26.1 |
| 2002/0116476 A1 * | 8/2002 | Eyal et al. | 709/219 |
| 2003/0037157 A1 * | 2/2003 | Pestoni et al. | 709/231 |
| 2005/0149872 A1 * | 7/2005 | Fong et al. | 715/727 |
| 2005/0262261 A1 * | 11/2005 | Deshpande | 709/231 |
| 2006/0031288 A1 * | 2/2006 | Ter Horst et al. | 709/204 |
| 2006/0143236 A1 * | 6/2006 | Wu | 707/104.1 |
| 2006/0173974 A1 * | 8/2006 | Tang | 709/217 |
| 2006/0195462 A1 * | 8/2006 | Rogers | 707/100 |
| 2006/0195512 A1 * | 8/2006 | Rogers et al. | 709/203 |
| 2006/0195513 A1 * | 8/2006 | Rogers et al. | 709/203 |
| 2006/0195514 A1 * | 8/2006 | Rogers et al. | 709/203 |
| 2006/0195515 A1 * | 8/2006 | Beaupre et al. | 709/203 |
| 2006/0195516 A1 * | 8/2006 | Beaupre | 709/203 |
| 2007/0083897 A1 * | 4/2007 | Brownell | 725/61 |
| 2008/0086379 A1 * | 4/2008 | Dion et al. | 705/14 |
| 2008/0120501 A1 * | 5/2008 | Jannink et al. | 713/163 |
| 2008/0208823 A1 * | 8/2008 | Hicken | 707/3 |
| 2008/0319856 A1 * | 12/2008 | Zito et al. | 705/14 |
| 2009/0055376 A1 * | 2/2009 | Slaney et al. | 707/5 |
| 2009/0063511 A1 * | 3/2009 | Myers et al. | 707/10 |
| 2009/0119173 A1 * | 5/2009 | Parsons et al. | 705/14 |
| 2009/0187936 A1 * | 7/2009 | Parekh et al. | 725/25 |
| 2009/0249222 A1 * | 10/2009 | Schmidt et al. | 715/751 |
| 2010/0082731 A1 * | 4/2010 | Haughay et al. | 709/203 |

(Continued)

OTHER PUBLICATIONS

Simon Lind Damgaard et al., "MEET: A Technical Framework Enabling Ubiquitous Music in a Social Context", http://vbn.aau.dk/files/44351906/MEET.pdf; 2011.*

(Continued)

*Primary Examiner* — Dennis Truong
(74) *Attorney, Agent, or Firm* — Foley & Lardner LLP (57) ABSTRACT

Methods, systems, and apparatuses, including computer programs encoded on computer-readable media, for receiving a plurality of metadata associated with a plurality of media items. Each metadata includes a ranking score and a resource locator of the media item. Queuing media item identifiers based on the plurality of metadata and ordering the queue based on the ranking scores. Retrieving a portion of a highest-ranking unplayed media item and providing the portion to a content playback device. Receiving vote indications for an unplayed media item. The ranking score of the unplayed media is updated item based on the received vote indications. The unplayed media items are reordered in the queue based upon the updated ranking score of the unplayed media item. Retrieving a portion of a highest-ranking unplayed media item in the reordered queue and providing the portion to a content playback device.

20 Claims, 7 Drawing Sheets

U.S. PATENT DOCUMENTS

| | | | |
|---|---|---|---|
| 2010/0228740 A1* | 9/2010 | Cannistraro et al. | 707/748 |
| 2010/0332568 A1* | 12/2010 | Morrison et al. | 707/912 |
| 2011/0066943 A1* | 3/2011 | Brillon et al. | 715/716 |

OTHER PUBLICATIONS

Ryan Dube, "Join the Party & Be a DJ at Rolling.Fm", http://www.makeuseof.com/tag/join-party-dj-rolling-fm/, Sep. 1, 2011.*

Synendo, "Music Party DJ", Apple App Store, Jan. 11, 2012.*

David Sprague et al., "Music Selection using the PartyVote Democratic Jukebox", ACM; Dec. 16, 2008.*

O'Hara et al., "Jukola: Democratic Music Choice in a Public Space", ACM, Dec. 21, 2004.*

Popescu, George et al., "Group Recommender Systems as a Voting Problem," EPFL, Feb. 2011.

* cited by examiner

MEDIA CONTENT VOTING, RANKING AND PLAYING SYSTEM

BACKGROUND

A user can access and store media content on a number of diverse devices and/or services. A group of users can collectively access their content using these diverse devices and/or services. Playlists that include some or all of the media content in a particular order can be created. These playlists can be used to play the included media content in the particular order.

SUMMARY

In general, one aspect of the subject matter described in this specification can be embodied in methods for receiving a plurality of metadata. The plurality of metadata include information associated with a plurality of media items. Each metadata in the plurality of metadata is associated with a media item and includes a ranking score, a resource locator of the media item, an associated user, and a title. Media item identifiers are placed in a queue based on the plurality of metadata. The queue is ordered based in part on the ranking scores of the plurality of metadata. At least a portion of a first media item is retrieved based in part on a first resource locator. The first media item corresponds to a highest-ranking unplayed media item identifier in the queue. An unplayed media item identifier corresponds to a media item that has not previously been retrieved during an iteration of the queue. The portion of the first media item is provided to one or more content playback devices. One or more vote indications are received for an unplayed media item from one or more user devices. The ranking score of the unplayed media is updated item based in part on the received one or more vote indications. The unplayed media items are reordered in the queue based upon the updated ranking score of the unplayed media item. At least a portion of a second media item is received based in part on a second resource locator. The second media item corresponds to a highest ranking unplayed media item identifier in the reordered queue. The portion of the second media item is provided to the one or more content playback devices. Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

A social jukebox allows users to queue and vote upon media items, such as video or audio files, that are to be played by a content playback device. Metadata associated with a media item is received and based upon the metadata the media item is queued for playback. Metadata associated with a media item can include a title of the content, a resource locator, an associated user, a ranking score. The metadata, however, does not necessarily include the media item itself. The media items are queued for playback by placing a media item identifier in a queue. Media items, therefore, can be queued based upon the received metadata. The media item identifier can include a reference to the metadata or the actual metadata. As the content playback device is playing queued media items, users can modify the queue based upon submitting votes on queued media items and/or submitting new media items to the queue. A user can submit to the queue any type of media accessible to the user, including but not limited to, an audio file, a video file, etc. The media item may be local to the content playback device, local to one or more devices associated with the user, or may be located at a remote device. The content playback device selects and plays the highest ranking unplayed media item from the queue.

Figure 1A:
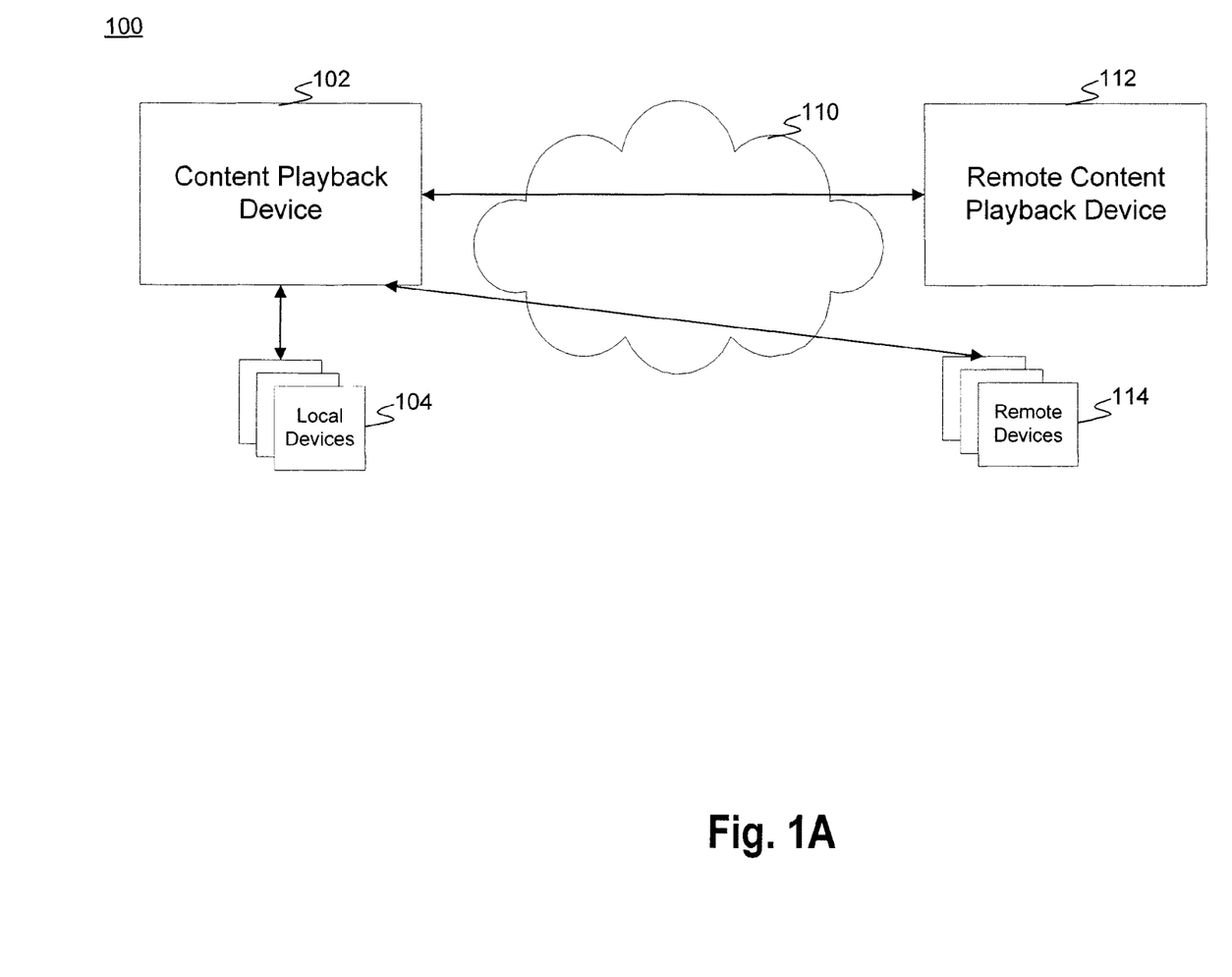
FIG. 1A illustrates a block diagram of an example environment in which a social jukebox plays media content in accordance with an illustrative implementation.
Figure 1B:
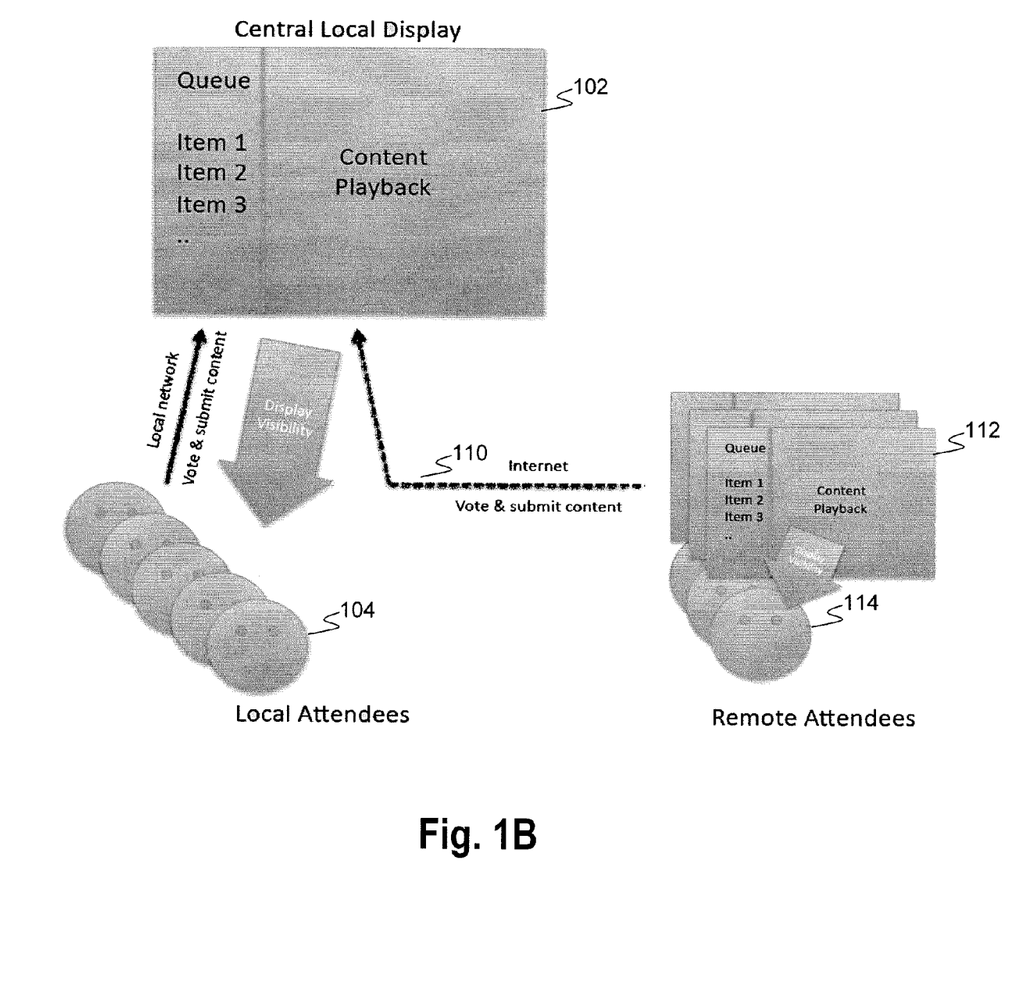
FIG. 1B illustrates a block diagram of an example environment in which a social jukebox plays media content in accordance with an illustrative implementation.

FIGS. 1A and 1B illustrate a block diagram of an example environment in which a social jukebox plays media content in accordance with an illustrative implementation. A content playing device 102 receives metadata associated with a media item. User devices, such as local devices 104 or remote devices 114, can provide metadata associated with a media item to the content play device 102. The metadata is associated with a media item based upon the resource locator contained within the metadata. The content playing device 102 can locate and retrieve the media item using the resource locator.

The content playing device 102 queues the metadata received from one or more local devices 104 based upon the ranking scores of the received metadata. For example, the queue may display the title from received metadata associated with a media item and the queue may be ordered based upon the ranking scores of the metadata. Local devices 104 can include, but are not limited to, cell phones, personal digital assistants, tablet computing devices, personal computers, personal storage devices, home media servers, etc. Data is transmitted between the content playback device 102 and the one or more local devices 104 using known local area network technologies. A local device can submit metadata to the content playback device 102 using the local area network. In addition, the content playback device 102 can also receive metadata from one or more remote devices 114, which may be a backup server, cloud computer, streaming media service, or other media service or server computer. The one or more remote devices 114 can send and receive data from the content playback device 102 using known wide area networking technologies. For example, data can be transmitted and received using a wide area network 110, such as the Internet. As known in the art, such data communications between the content playback device 102 and the devices 104 and 114 can be encrypted using known security protocols.

In addition to submitting metadata associated with media items to be played by the content playback device 102, devices 104 and 114 can submit and the content playback device 102 may receive votes for queued metadata. The content playback device 102 may include its own user input device (e.g., buttons, d-pad, keyboard, touch screen, etc.) for receiving votes. A vote can be a thumbs up or thumbs down indication or can be a numerical value associated with the media item, for example, a ranking of zero to five stars. A vote indicator changes the ranking score of the associated media item. For example, a positive vote can increase the ranking score of a media item and a negative vote can decrease the ranking score of a media item. In one implementation, a positive vote indication increases and a negative vote indication decreases the ranking score by a predetermined number such as 1. In another implementation, the ranking score is an average of received rankings. The media item identifiers within the queue are ordered based upon the ranking scores of the associated media items. The media item identifiers can be ordered in either ascending or descending order.

Metadata associated with a media item can include a title of the content, a resource locator, an associated user, and a ranking score. The resource locator identifies the location of the media item that is to be retrieved and played by the content playing device 102. In one implementation, the resource locator is a uniform resource locator (URL) that points to the media item. A URL may reference one of the local devices 104, one of the remote devices 114, the content playback device, a remote content playback device 112, a remote server, etc. The metadata can also include a username and password associated with the media item that can be used to access the media item. User credentials may be stored on device 102 and/or received from a user and then passed to devices 104 and/or 114 to gain authorized access to the content selected for playback.

The title of the media item can be derived from the resource locator or may be entered by the user. For example, a media item that includes a URL to a video clip may use the title of the web page associated with the URL as the title of the media item. The title may also be derived based upon the content of the web page. For example, a title of a video can be located in a known location within the content. The title, therefore, can be derived based upon retrieving the content of the web page.

Using the associated metadata, a media item can be associated with a user who originally submitted the metadata associated with the media item to the queue. In one implementation, a media item is associated with more than one user. For instance, the media item may be associated with each person who submitted the media item. The metadata can also contain information on the users who submitted votes for the media item. The user and the user's vote indication can also be contained within the metadata.

The ranking score of a media item can initially be set to a predetermined default value. For example, a neutral score such as zero or an average ranking score, such as 2.5, can be used. If an associated media item identifier was previously part of a queue, the previous ranking score can also be used as the initial ranking score of the media item. Accordingly, the ranking scores of media items can be stored for later use, even if the media item is no longer part of the queue. The initial ranking score can also be selected from remote sites or other playback programs that includes some ranking indication of the media item. In these cases, the ranking value can be normalized to the ranking score of the queue. For example, if the ranking score is based upon the number of users who like or dislike a media item, external ranking scores can be normalized to one of −1, 0, or +1. As an example, if a user had previously ranked a media item as five stars, this ranking can be normalized to a ranking score of −1, 0, or +1. In this example, a ranking score of 2.5 stars or greater can result in a +1 ranking score and anything below 2.5 stars can result in a −1 vote. Alternatively, a ranking score of 4 or above can be normalized to a +1 ranking score, a ranking score of 2 or below can be normalized to a −1 ranking score, and a ranking score between 2 and 4 can be normalized to a 0 ranking score.

In one implementation, metadata associated with a media item includes information indicating that a ranking score was calculated or deduced. A calculated vote indication can be treated differently than a vote indication received directly from a user. For example, media items can have an initial ranking score calculated based upon previously submitted vote information or ranking information from another site or program. A user can then directly submit a vote for a particular media item. This direct vote can replace the previously calculated vote associated with that user for the media item. In another implementation, calculated ranking scores are given less weight than a direct vote. For example, a calculated ranking score can have a maximum ranking score, while a direct vote indication can impact the ranking score by an amount greater than the maximum ranking score of the calculated ranking score. For example, a calculated ranking score can have a maximum value of five. A direct vote indication can change the ranking score by a maximum of ten. Such a system ensures that ranking of the media items will give more weight to direct vote indications than to calculated ranking scores.

Initially, the queue of the content playback device 102 may be empty. As new metadata associated with media items are received from the one or more viewing devices, the content playback device 102 creates a queue and inserts media item identifiers associated with media items into the queue. The queue orders the media item identifiers based upon the ranking scores of the media items. The content playback device 102 can set a default ranking score to each metadata associated with a media item received.

In one implementation, the content playback device 102 derives and queues each of the media item identifiers based upon every received metadata. In another implementation, the content playback device 102 analyzes the received metadata to avoid queuing duplicate media item identifiers. As examples, metadata that have matching resource locators, matching titles, or both matching resource locators and titles to a media item identifier already queue can be ignored. In another implementation, the ranking score of a queued media item identifier is updated based upon the content playback device 102 finding a match. For example, the content playback device 102 determines if received metadata matches a media item identifier present in the queue. If a match is found, the matching media item has its ranking score updated, for example, by incrementing the score by a predetermined amount. If no match is found, a media item identifier associated with the metadata is added to the queue.

In another implementation, the queue can be populated initially by the content playback device 102 broadcasting a request to the local devices 104 and the remote devices 114 to submit metadata associated with media items. The devices 104 and 114 can submit any selected content to the content playback device 102. For example, a user may have selected content by placing the content into a particular folder or may have indicated that the content is to be shared with a social jukebox. Metadata can also be manually submitted from the devices 104 and 114. For example, upon receipt of a request for media items from the content playback device 102, the devices 104 and 114 may provide a visual or audible indication for the user to submit media items to be queued.

In another implementation, upon receipt of metadata associated with a media item, the content playback device 102 can determine if a media item identifier associated with the media item is already queued. In one implementation, a media item identifier is already in the queue when the media item identifiers match. For example, a media item identifier can include an artist and media item title. If a match is found, the matching media item can have its ranking score incremented some amount, instead of queuing a duplicate media item identifier. This effectively counts the number of devices 104 and 114 that have submitted the media item. The ranking score and the initial order of the queue are, therefore, associated with the number of devices that have submitted the media item. As the ranking scores of the media items change, the content playback device 102 can reorder the queue. After a certain amount of time has elapsed and/or the queue contains a predetermined number of media item identifiers, the content playback device 102 can retrieve and play the media item associated with the highest-ranking queued media item identifier. In some implementations, when media item identifiers match it is possible for the resource locators within the metadata associated with the matching media item identifiers to be different. In one implementation, the metadata associated with the media item identifier can be updated to include all possible resource locators for the media item. When the content playback device 102 plays the media item, the content playback device 102 can choose one of the possible resource locators. If the content playback device 102 is unable to retrieve the media item from a selected resource locator, a second resource locator can be used. In another implementation, the content playback device 102 can monitor the availability of the media file before the media file is requested. For example, a media item can be stored on two or more user devices. The content playback device 102 can monitor if each of these devices are accessible by the content playback device 102. Any resource locator associated with a user device that is not currently available can be indicated as not accessible. The content playback device 102 can then use a resource locator that references an accessible user device.

As the content playback device 102 plays media items, the queue can be divided into played content and unplayed content. The ordering of the media item identifiers identifying media items that have been played can remain unchanged until a reordering of the entire queue is required or requested. Unplayed content, however, can be continually reordered based upon the content playback device 102 receiving metadata associated with new media items and/or votes associated with queued media items. In one implementation, once all of the media items have been played, the entire queue is reordered and the content playback device 102 repeats the playing of the queue media items starting with the highest-ranking media item. In another implementation, the content playback device 102 stops playing when the last media item has been played.

Local attendees can view at least a portion of the queue on the content playback device 102. The content playback device 102 displays at least a portion of the current queue. For example, the content playback device 102 can display information regarding a predetermined number of previously played media items, the currently playing media item, and a predetermined number of media items that will be played after the currently playing media item. In another implementation, the entire queue is displayed on the content playback device 102. Local users can, therefore, see at least a portion of the queue directly on the content playback device 102. The content playback device 102 can also provide queue information to the local devices 104. The queue information can include information regarding the entire queue or can contain information about the currently playing media item, a predetermined number of previously played media items, and a predetermined number of upcoming media items. For example, the queue information can include the information that is displayed on the content playback device 102. The content playback device 102 can also provide this information to remote devices 114. One or more remote content playback devices 112 can also be provided the queue information. The remote content playback device 112 can display this queue information and play a media item in parallel with the content playback device 102. The remote content playback device 112 is controlled by the content playback device 102. For example, a playing media item can be paused, skipped, fast forwarded, etc., through interaction with the content playback device 102. The content playback device 102 provides an indication of its state to the remote content playback device 112, and the remote content playback device 112 takes a corresponding action.

The content playback device 102 uses a resource locator associated with the media item to access the media item that is played. The media item can be audio data that is output through one or more speakers. Additionally, the media item can be video data that is displayed on a screen of the content playback device. The media item can be streamed to the content playback device 102 or can be requested in its entirety prior to being played. In addition, the content playback device 102 can cache a copy of the media item for future playback. In one implementation, a cached copy of a media item is deleted when the content playback device 102 can no longer access the content. For example, a cached media item from a local device can be deleted if the local device is no longer accessible to the content playback device 102. The content playback device 102 can also stream or provide the media to one or more remote content playback devices 112. In another implementation, the content playback device 102 provides the resource locator to the remote content playback device 114, which uses the resource locator to access the media.

In another implementation, local devices 104 and/or remote devices 114 can preview media items in the queue. A device can request a preview of any particular media item that is currently in the queue. In one implementation, the device receives, in response to a preview request of a media item, the resource locator associated with the media item. In addition, the device can receive any access information, such as a username and/or password, required to access the media item. The device can use the resource locator to request at least a portion of the media item. Alternatively, the device can receive a resource locator to a portion of the media file that is different than the resource locator associated with the media item. For example, the resource locator associated with a preview of a media item may identify a portion of the media item. As an example, the resource locator of a media item preview may identify a 15 s, 30 s, 60 s, etc. sample of the media item. In another implementation, the device can receive at least a portion of the media item directly from the content playback device 102. For example, the content playback device 102 can transmit the entire media item or a 15 s, 30 s, 60 s, etc. portion of the media item to the device. The media item can be previewed on the device independently from any media item currently being played on the content playback device 102. A user can, therefore, preview a media item in the queue without interrupting the media items being played on the content playback device 102. Previewing of media items allows users to play at least of a portion of a media item before voting on the media item. For example, a user may not be familiar with a particular media item. A user can request a preview of the media item and upon completion of the preview, can be prompted to vote on the media item.

Figure 2A:
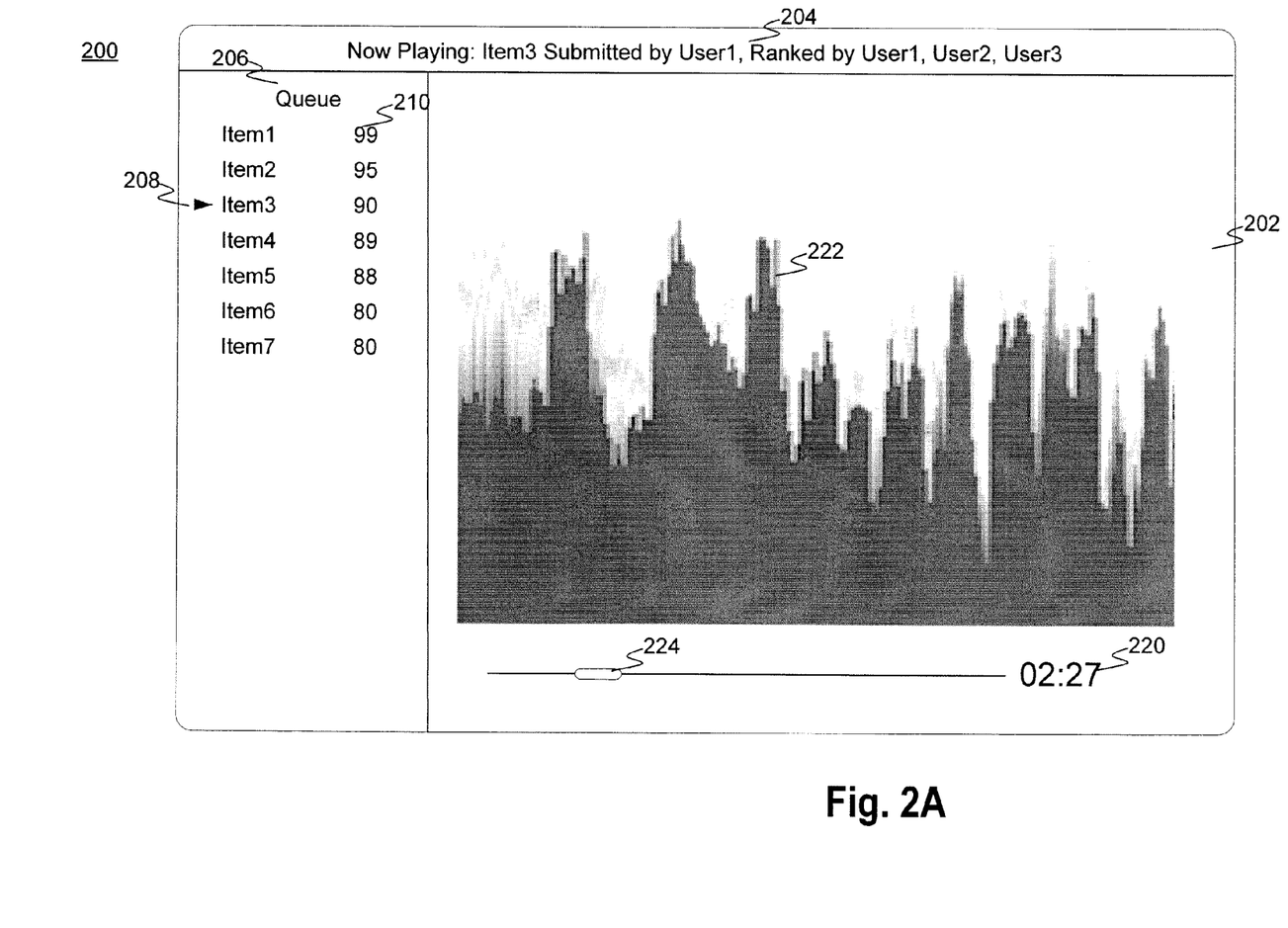
FIGS. 2A-2C illustrate a user interface of a social jukebox in accordance with an illustrative implementation.
Figure 2B:
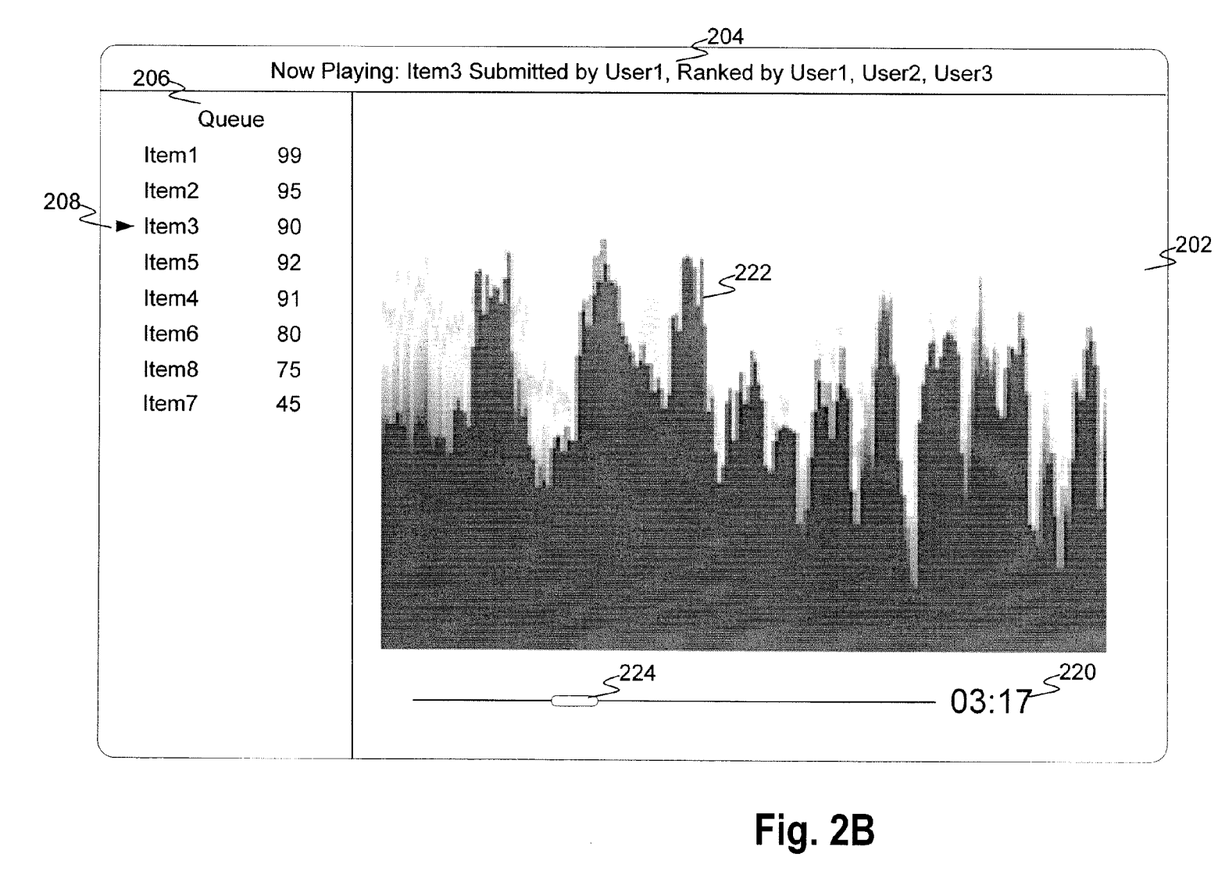
Figure 2C:
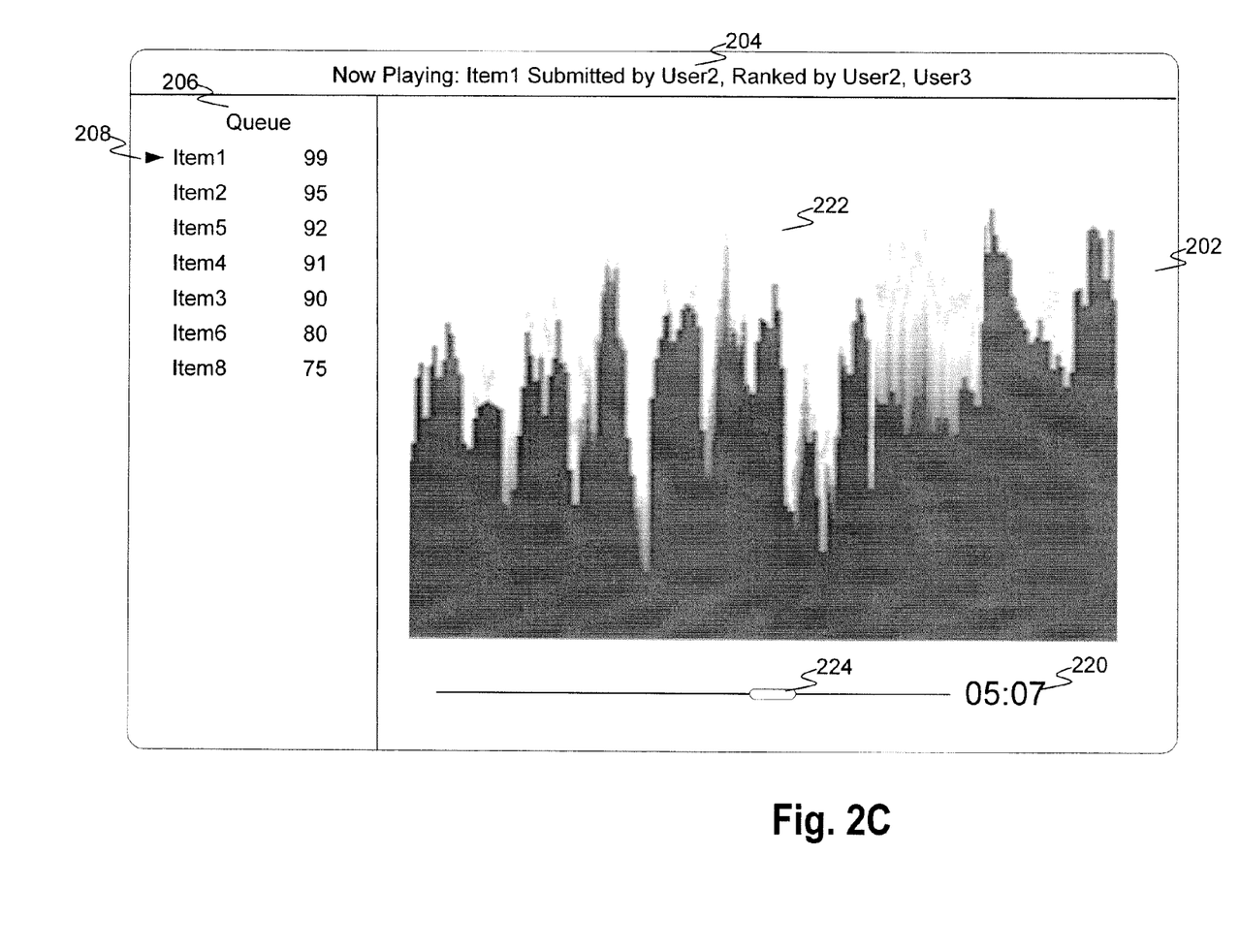

FIGS. 2A-2C illustrate a user interface of a social jukebox in accordance with an illustrative implementation. FIG. 2A illustrates a display of the content playback device 102 playing media item Item3. An indicator 208 can be used to indicate the currently playing queued media item. The indicator can also be or include bolded text, highlighting, etc. The user interface 200 includes a title area 204, a queue area 206, and a content viewing area 202. The content viewing area 202 provides data related to the media item currently being viewed. For example, the content viewing area 202 can be used to show a video clip. In addition, the content viewing area 202 may include a visualization of an audio clip, such as a spectrum analyzer 222. The content viewing area 202 can also include data such as, an album cover, links to other information about the media item, etc. The content viewing area 202 can also include standard controls and information, such as a position indicator 224 and a current position within the media item 220. The standard controls can also include fast forward, rewind, skip to next queued media item, return to the previously queued media item, etc.

The title area 204 can include information regarding the currently playing media item. This information can include the title of the media item, who submitted the media item, and who voted on the media item. The information can also include an indication as to which users liked the media item and which users disliked the media item, an album cover, links to other information about the media item, etc.

The queue area provides information on at least some of the queued media items. The current ranking score 210 for each media item can be displayed. The queue area 206 allows users to see what is currently playing and also provides a list of upcoming media items.

As described above, the ordering of the queued media item identifiers is based upon the ranking score associated with the media items. Users can vote during the playback of the media items, and such voting can reorder the queue. For example, in FIG. 2A, Item3 is currently playing and has a ranking score that is higher than the ranking score of Item4 and Item5. While media items are being played, users can submit voting indicators for any of the queued media items. For example, one or more users can submit vote indicators that change the ranking scores of Item4 and Item5, such that the ordering of the queue based upon the ranking score would change. FIG. 2B illustrates such a change. The ranking score associated with Item5 has been increased by 4 and the ranking score associated with Item4 has been increased by 3. The queue is reordered to take into account the updated ranking scores. Item4 and Item5 remain ranked in the queue below Item3 to ensure that Item4 and Item5 play after Item3 completes. Once the media items have all been played or the playlist is restarted, the media items can be reordered. FIG. 2C illustrates this reordering. As illustrated in the queue area 206 of FIG. 2C, Item5 and Item4 are now positioned before Item3 based upon the respective ranking scores.

A media item identifier associated with a media item can also be removed automatically from the queue based upon the ranking score associated with the media item. For example, a media item whose ranking score falls below a predetermined score can be removed from the queue. In one implementation, the media item can be removed as soon as the ranking score falls below the predetermined level. In another implementation, the media item can be removed after the ranking score has fallen below the predetermined level for a predetermined period of time. In yet another implementation, the content playback device 102 can determine if the ranking score is below the predetermined level before the media item data is retrieved. If a media item is below the predetermined level, the media item is not required to be retrieved. A visual indication, such as but not limited to an indicator, flashing text, or a font color change, can indicate that a media item is below the predetermined level and may not be retrieved or played. As an example, the predetermined level can be set to 50. FIG. 2B illustrates that the ranking score of Item7 has fallen to 45. Item7 can be removed after Item7 fell below a ranking score of 50 for a period of time or before the content playback device 102 attempted to access the media item for Item7. FIG. 2C illustrates that Item7 has been removed from the queue.

As the queue of the content playback device is dynamic, new media items can be added to the queue while a queued media item is being played. FIG. 2B illustrates that Item8 has been added to the queue. The ranking score associated with Item8 places Item8 after Item6 and before Item7 in the queue. Additional media items can be added while media items are played by the devices 104 and/or 114 submitting metadata associated with new media items.

Figure 3:
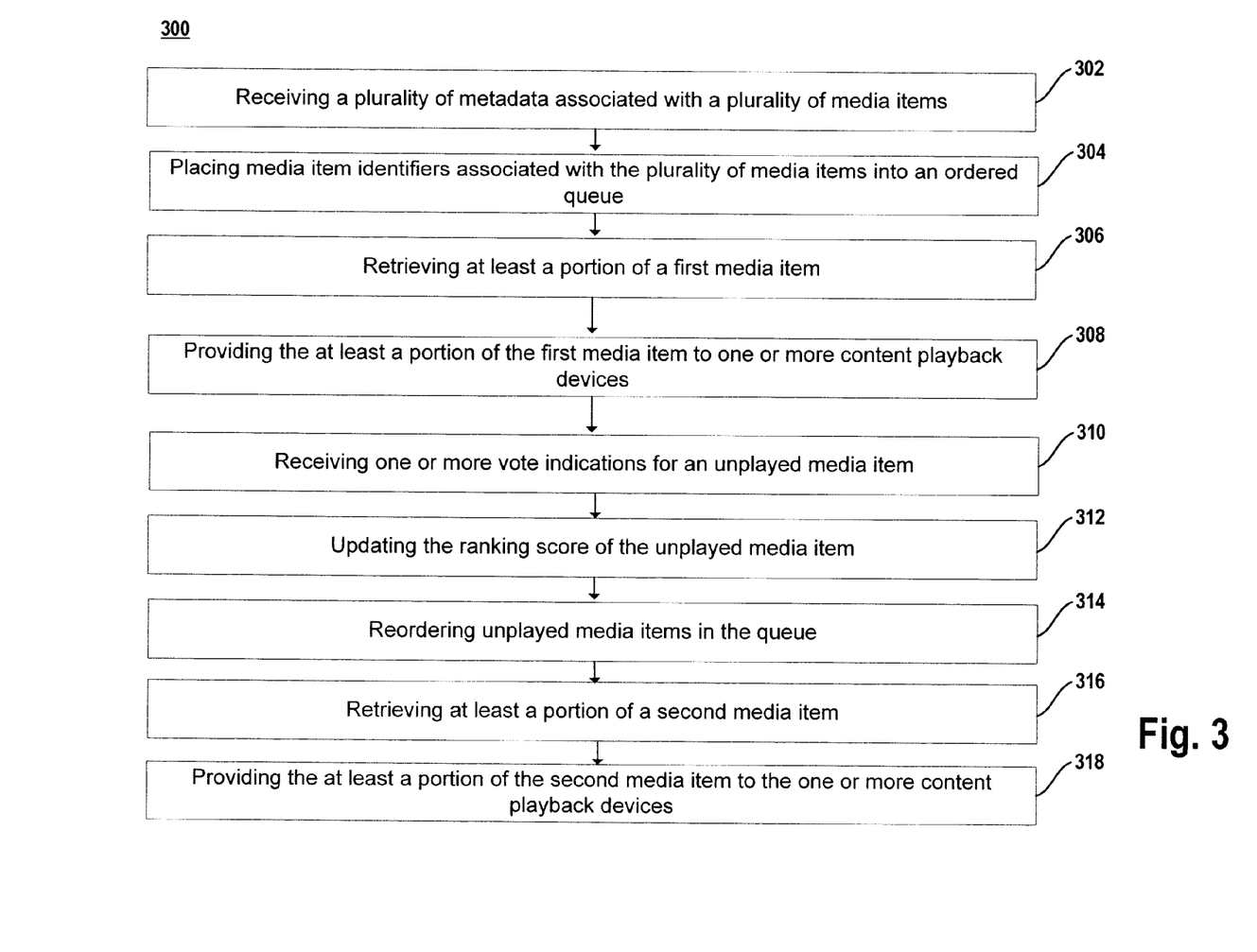
FIG. 3 is a flow diagram of a process for reordering a queue of media item identifiers based upon receiving vote indications in accordance with an illustrative implementation.

FIG. 3 is a flow diagram of a process for reordering of a queue of media item identifiers based upon receiving vote indications in accordance with an illustrative implementation. The process 300 can be implemented on a computing device. In one implementation, the process 300 is encoded on a computer-readable medium that contains instructions that, when executed by a computing device, cause the computing device to perform operations of process 300.

A plurality of metadata associated with a plurality of media items is received (302). For example, a content playback device 102 can receive a plurality of metadata associated with a plurality of media items from devices 104 and 114. Media item identifiers for each media item can be create based upon the metadata. The media item identifiers are placed into a queue (304). The ordering of the queue can be based upon a ranking score associated with each media item. The ranking score associated with a media item can be initialized as described above. The content playback device 102 can select the highest ranking unplayed media item as the next media item to play. The highest ranking unplayed media item identifier is selected and the associated metadata is used to retrieve the media item. The resource locator can be used to retrieve at least a portion of the highest ranking unplayed media item (306). The media item is provided to one or more content playback devices (308). For example, at least a portion of the media item can be provided to the content playback device 102. In addition, at least a portion of the media item can be provided to the remote content playback device 112. The content playback device 102 can receive the media item as a stream and start playing the media item before the entire media item has been retrieved, or can retrieve the entire media item before starting playback.

While the media item is being provided to the one or more content playback devices, one or more vote indications for an unplayed media item are received (310). In addition, vote indications for other played or unplayed media items can be received, and the corresponding ranking scores can be updated. The ranking score of the unplayed media item is updated based upon the one or more received vote indications (312). The unplayed media item identifiers in the queue are reordered based upon the updated ranking scores (314). For example, three vote indications may be received regarding a media item that has not yet been played. The updated ranking score of the media item can move that media item up in the unplayed portion of the queue. Upon reordering of the unplayed portion of the queue, the media item may be the next media item to be provided. After reordering of the queue, at least a portion of a second media item is retrieved based upon the resource locator associated with the highest-ranking unplayed media item (316). For example, the second media item can be retrieved at some point prior to being played. At least a portion of the second media item is provided to the one or more content playback devices (318).

Figure 4:
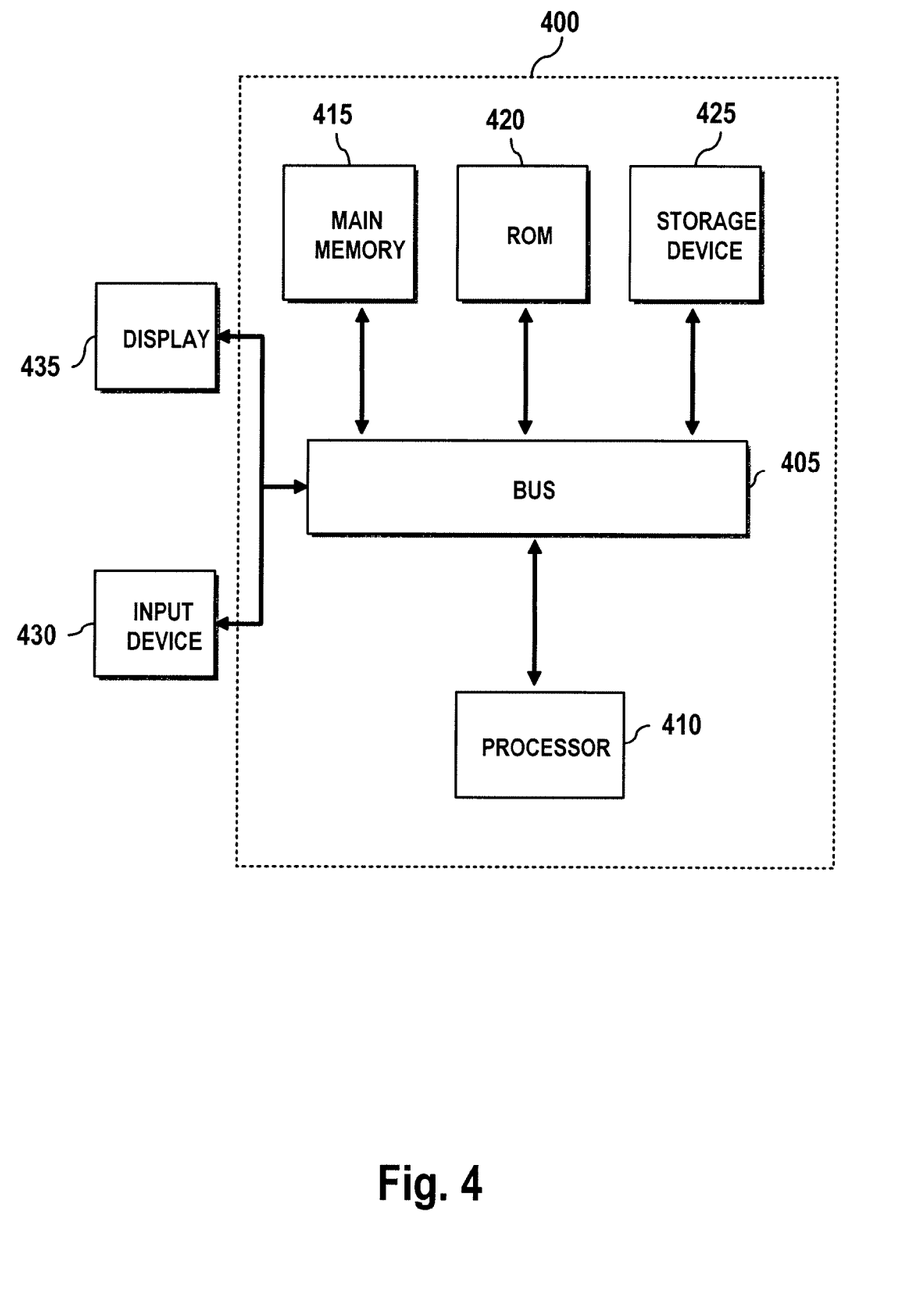
FIG. 4 is a block diagram of a computer system in accordance with an illustrative implementation.

FIG. 4 is a block diagram of a computer system in accordance with an illustrative implementation. The computer system or computing device 400 can be used to implement content playback devices 102 and 112 and/or devices 104 and 114, etc. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 410 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a processing circuit, a plurality of metadata, wherein the plurality of metadata comprises information associated with a plurality of media items requested to be added to a queue of media items, wherein each metadata in the plurality of metadata is associated with a media item and comprises a ranking score, a resource locator of the media item, an associated user, and a title;
   placing in the queue, using the processing circuit, media item identifiers for the plurality of media items based on the plurality of metadata, wherein the queue is ordered based in part on the ranking scores of the plurality of metadata;
   determining, by the processing circuit, that a first media item is unavailable from a first device based in part on a first resource locator in the metadata for the first media item;
   retrieving at least a portion of the first media item from a second device based in part on a second resource locator in the metadata for the first media item, wherein the first media item corresponds to a highest-ranking unplayed media item identifier in the queue, wherein an unplayed media item identifier corresponds to a media item that has not previously been retrieved during an iteration of the queue, and wherein the first resource locator corresponds to a different device than that of the second resource locator;
   providing the portion of the first media item to one or more content playback devices;
   receiving one or more vote indications for an unplayed media item from one or more user devices;
   updating the ranking score of the unplayed media item based in part on the received one or more vote indications;
   reordering unplayed media items in the queue based upon the updated ranking score of the unplayed media item;
   retrieving at least a portion of a second media item based in part on a resource locator in the metadata for the second media item, wherein the second media item corresponds to a highest ranking unplayed media item identifier in the reordered queue; and
   providing the portion of the second media item to the one or more content playback devices.

2. The method of claim 1, further comprising:
   for each of the metadata determining a number of matching metadata that correspond to the same media item or copies of the same media item, wherein the plurality of metadata is received from one or more computing devices and each of the metadata is received in response to a request to add a media item to the queue;
   combining the matching metadata into a single metadata; and
   setting the ranking score of the single metadata to a value corresponding to the number of matching metadata.

3. The method of claim 2, further comprising reordering the queue based on a determination that the queue contains no unplayed media item identifiers.

4. The method of claim 3, further comprising:
   receiving, at the processing circuit, a request from an electronic device to preview an unplayed media item in the queue; and
   providing the requested preview of the unplayed media item to the electronic device.

5. The method of claim 4, wherein the provided preview comprises a portion of the unplayed media item.

6. The method of claim 4, wherein the metadata for the previewed media item further comprises a resource locator to a sample of the media item that differs from the resource locator to the media item, and wherein the requested preview of the media item comprises the sample of the media item.

7. The method of claim 6, wherein the first resource locator corresponds to an identifier of the first device on a local area network and the second resource locator corresponds to a uniform resource locator (URL).

8. The method of claim 7, wherein the portion of the first media item is provided to the one or more content playback devices via the Internet.

9. A system comprising:
one or more processing circuits configured to:
receive a plurality of metadata, wherein the plurality of metadata comprises information associated with a plurality of media items requested to be added to a queue of media items, wherein each metadata in the plurality of metadata is associated with a media item and comprises a ranking score, a resource locator of the media item, an associated user, and a title;
place in the queue media item identifiers for the plurality of media items based on the plurality of metadata, wherein the queue is ordered based in part on the ranking scores of the plurality of metadata;
determine that a first media item is unavailable from a first device based in part on a first resource locator in the metadata for the first media item;
retrieve at least a portion of the first media item from a second device based in part on a second resource locator in the metadata for the first media item, wherein the first media item corresponds to a highest-ranking unplayed media item identifier in the queue, wherein an unplayed media item identifier corresponds to a media item that has not previously been retrieved during an iteration of the queue, and wherein the first resource locator corresponds to a different device than that of the second resource locator;
provide the at least a portion of the first media item to one or more content playback devices;
receive one or more vote indications for an unplayed media item from one or more user devices;
update the ranking score of the unplayed media item based in part on the received one or more vote indications;
reorder unplayed media items in the queue based upon the updated ranking score of the unplayed media item;
retrieve at least a portion of a second media item based in part on a resource locator in the metadata for the second media item, wherein the second media item corresponds to a highest ranking unplayed media item identifier in the reordered queue; and
provide the at least a portion of the second media item to the one or more content playback devices.

10. The system of claim 9, wherein the one or more processing circuits are further configured to:
determine, for each of the metadata, a number of matching metadata that correspond to the same media item or copies of the same media item, wherein the plurality of metadata is received from one or more computing devices and each of the metadata is received in response to a request to add a media item to the queue;
combine the matching metadata into a single metadata; and
set the ranking score of the single metadata to a value corresponding to the number of matching metadata.

11. The system of claim 10, wherein the one or more processing circuits are further configured to reorder the queue based on a determination that the queue contains no unplayed media item identifiers.

12. The system of claim 11, wherein the one or more processing circuits are configured to:
receive a request from an electronic device to preview an unplayed media item in the queue; and
provide the requested preview of the unplayed media item to the electronic device.

13. The system of claim 12, wherein the provided preview comprises a portion of the unplayed media item.

14. The system of claim 12, wherein the metadata for the previewed media item further comprises a resource locator to a sample of the media item that differs from the resource locator to the media item, and wherein the requested preview of the media item comprises the sample of the media item.

15. A non-transitory computer-readable medium having instructions stored thereon, the instructions comprising:
instructions to receive a plurality of metadata, wherein the plurality of metadata comprises information associated with a plurality of media items requested to be added to a queue of media items, wherein each metadata in the plurality of metadata is associated with a media item and comprises a ranking score, a resource locator of the media item, an associated user, and a title;
instructions to place in the queue media item identifiers for the plurality of media items based on the plurality of metadata, wherein the queue is ordered based in part on the ranking scores of the plurality of metadata;
instructions to determine that a first media item is unavailable from a first device based in part on a first resource locator in the metadata for the first media item;
instructions to retrieve at least a portion of the first media item from a second device based in part on a second resource locator in the metadata for the media item, wherein the first media item corresponds to a highest-ranking unplayed media item identifier in the queue, wherein an unplayed media item identifier corresponds to a media item that has not previously been retrieved during an iteration of the queue, and wherein the first resource locator corresponds to a different device than that of the second resource locator;
instructions to provide the at least a portion of the first media item to one or more content playback devices;
instructions to receive one or more vote indications for an unplayed media item from one or more user devices;
instructions to update the ranking score of the unplayed media item based in part on the received one or more vote indications;
instructions to reorder unplayed media items in the queue based upon the updated ranking score of the unplayed media item;
instructions to retrieve at least a portion of a second media item based in part on a resource locator in the metadata for the second media item, wherein the second media item corresponds to a highest ranking unplayed media item identifier in the reordered queue; and
instructions to provide the at least a portion of the second media item to the one or more content playback devices.

16. The non-transitory computer-readable medium of claim 15, wherein the instructions further comprise:
instructions to determine, for each of the metadata, a number of matching metadata that correspond to the same media item or copies of the same media item, wherein the plurality of metadata is received from one or more computing devices and each of the metadata is received in response to a request to add a media item to the queue;
instructions to combine the matching metadata into a single metadata; and
instructions to set the ranking score of the single metadata to a value corresponding to the number of matching metadata.

17. The non-transitory computer-readable medium of claim 16, wherein the instructions further comprise instructions to reorder the queue based on a determination that the queue contains no unplayed media item identifiers.

18. The non-transitory computer-readable medium of claim 17, wherein the instructions further comprise instructions to receive a request from an electronic device to preview an unplayed media item in the queue and instructions to provide the requested preview of the unplayed media item to the electronic device.

19. The non-transitory computer-readable medium of claim 18, wherein the provided preview comprises a portion of the unplayed media item.

20. The non-transitory computer-readable medium of claim 18, wherein the metadata for the previewed media item further comprises a resource locator to a sample of the media item that differs from the resource locator to the media item, and wherein the requested preview of the media item comprises the sample of the media item.

\* \* \* \* \*